US007413428B1

(12) United States Patent
Park

(10) Patent No.: US 7,413,428 B1
(45) Date of Patent: Aug. 19, 2008

(54) POTTERY TOOL

(76) Inventor: Arthur R. Park, 1126 Hoffman Ave., Royal Oak, MI (US) 48067

( * ) Notice: Subject to any disclaimer, the term of this patent is extended or adjusted under 35 U.S.C. 154(b) by 371 days.

(21) Appl. No.: 10/973,221

(22) Filed: Oct. 26, 2004

(51) Int. Cl.
*B29C 59/02* (2006.01)

(52) U.S. Cl. ..................... 425/268; 425/458; 15/236.07

(58) Field of Classification Search .................. 425/87, 425/265, 268, 458, 459; 15/145, 236.03, 15/236.07; 30/329, 344, 333–334; 407/64, 407/99, 106; 433/143, 147; 81/489, 491; 606/170; D7/649
See application file for complete search history.

(56) References Cited

U.S. PATENT DOCUMENTS

| | | | | | |
|---|---|---|---|---|---|
| 2,049,898 | A | * | 8/1936 | Driest | 279/43 |
| D230,695 | S | * | 3/1974 | Bartz | D7/650 |
| D252,315 | S | * | 7/1979 | Dart | D7/650 |
| 4,173,071 | A | * | 11/1979 | Ishida | 30/339 |
| D350,260 | S | * | 9/1994 | Weaver | D7/649 |
| 5,480,507 | A | * | 1/1996 | Arnold | 30/344 |
| 5,675,860 | A | * | 10/1997 | Campbell | 425/458 |
| 6,219,878 | B1 | * | 4/2001 | Dewberry | 425/458 |
| 6,651,346 | B1 | * | 11/2003 | Sturgis et al. | 30/337 |
| D507,158 | S | * | 7/2005 | Smith et al. | D7/649 |

* cited by examiner

*Primary Examiner*—Yogendra N. Gupta
*Assistant Examiner*—Thu Khanh T. Nguyen
(74) *Attorney, Agent, or Firm*—Reising, Ethington, Barnes, Kisselle, P.C.

(57) ABSTRACT

A pottery tool for forming soft clay to make hand built pottery articles which tool includes an elongate body having a top side, a bottom side, a right and left side, and at least one end. The top surface includes at least one tapered region having a compound convex surface adjacent one end. The right and left sides each include at least one edge, wherein each at least two edges differ in configuration. The pottery tool has a plurality of forming surfaces and edges for smoothing, shaping or scraping a softened clay body for forming the pottery article.

24 Claims, 6 Drawing Sheets

POTTERY TOOL

FIELD OF THE INVENTION

The present invention relates to pottery tools and, more particularly, to a tool for shaping pottery or other clay-formed articles.

BACKGROUND OF THE INVENTION

Hand built pottery articles such as a cup may be made by manually forming and shaping and then assembling a plurality of separate pieces from a body of softened clay such as a bottom, a tubular sidewall, and a handle and attaching one end of the sidewall to the bottom and the handle to the sidewall. Hand built pottery articles may be shaped using profiling pottery tools by applying the tools to a body of softened clay. The design of a pottery tool may vary depending upon the desired shape or profile for all or part of the pottery article, where usually a single tool is used for obtaining a single shape. For example, if a cut or a deeply curved shape is desired, use of a tool having a thin blade or wire may be required. However, if a smooth shape is desired, a thicker tool having a more rounded edge may be more useful. In either case, usually only one tool is used for forming a single desired profile or shape into the clay body. Some portions of the body may also be shaped by the fingers of a potter's hand because a tool with a desired profile is unavailable.

SUMMARY OF THE INVENTION

The present invention provides a pottery tool for forming a variety of profiles in a body of softened clay for forming a pottery article. The pottery tool includes an elongate body having at least two sides, and at least one end each with at least one edge. At least two of the edges have a surface with a different cross-sectional configuration for shaping all or part of a body of softened clay.

Objects, features and advantages of this invention include providing a pottery tool for forming a plurality of shapes on a body of softened clay that is easily usable and controllable for the user to produce more accurate shapes and surfaces on the clay body, may be easily fabricated out of wood or plastic by simple machining, is relatively inexpensive and, in service has a long useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE INVENTION

First Embodiment

Figure 1:
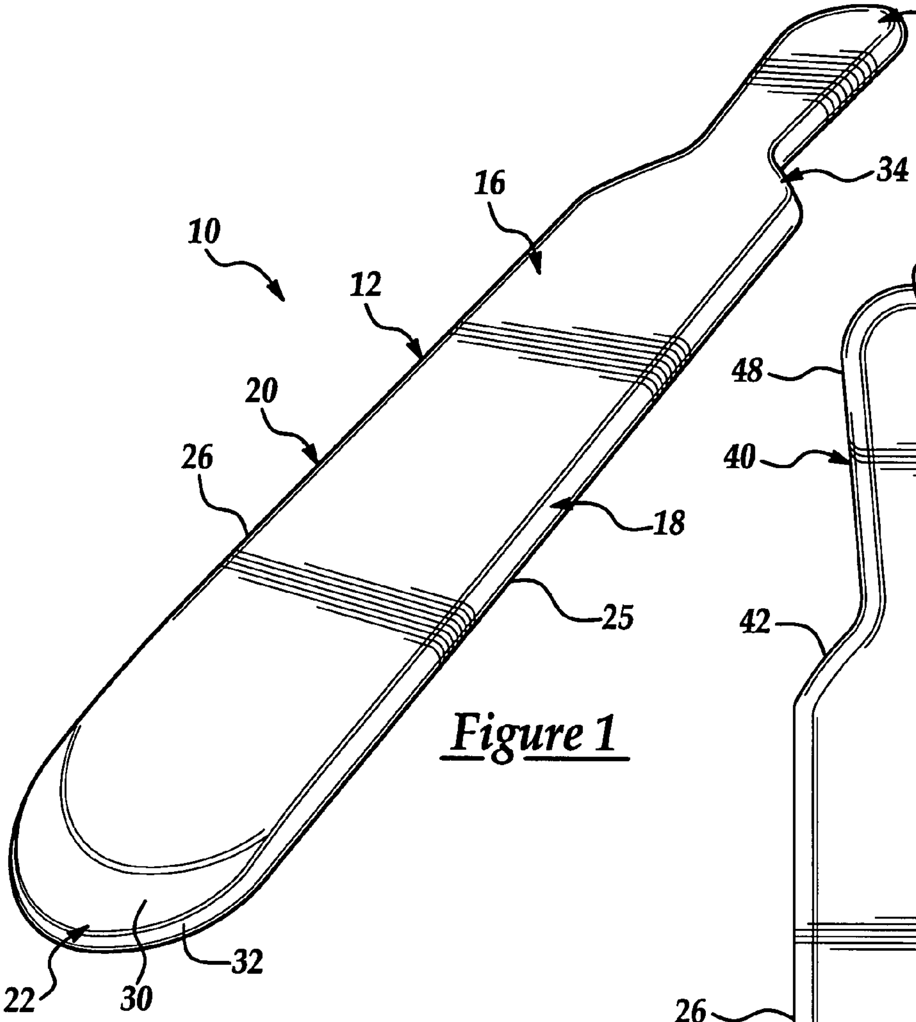
FIG. 1 is a perspective view of a pottery tool embodying the invention.

With reference now to the drawings, FIGS. 1-7 illustrate a first pottery tool 10 embodying the invention for shaping softened clay for forming a hand built, or hand formed, pottery article and parts of a pottery article. The pottery tool 10 has an elongate body 12 with a bottom side 14, a top side 16, a right side 18, a generally parallel left side 20, an end 22 and a handle 24. The right side 18 has a rounded edge 25, whereas the left side 20 has a flat central surface 26, a rounded edge 27 and a sharp edge 28. The end 22 has a generally tapered region 30 and a blunt surface 32. The handle 24 is formed on the elongate body 12 at an end 34 opposite the end 22 and has a rounded edge 36, a right side 38 and a left side 40, which merge into shoulders 42. The pottery tool 10 may otherwise have one, two, or more sides, wherein each side has a least one edge. The pottery tool 10 is a multi-functional tool that may be used for smoothing, shaping, scraping or other like processes and is generally made of a material with a slightly porous exterior surface, preferably a hard wood such as maple, or may otherwise be made of plastic preferably textured or coated within a non-stick material.

Figure 4:
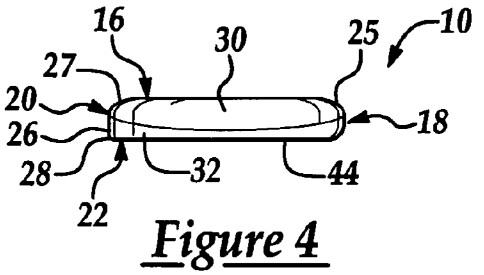
FIG. 4 is a left end view of the pottery tool of FIG. 1.
Figure 7:
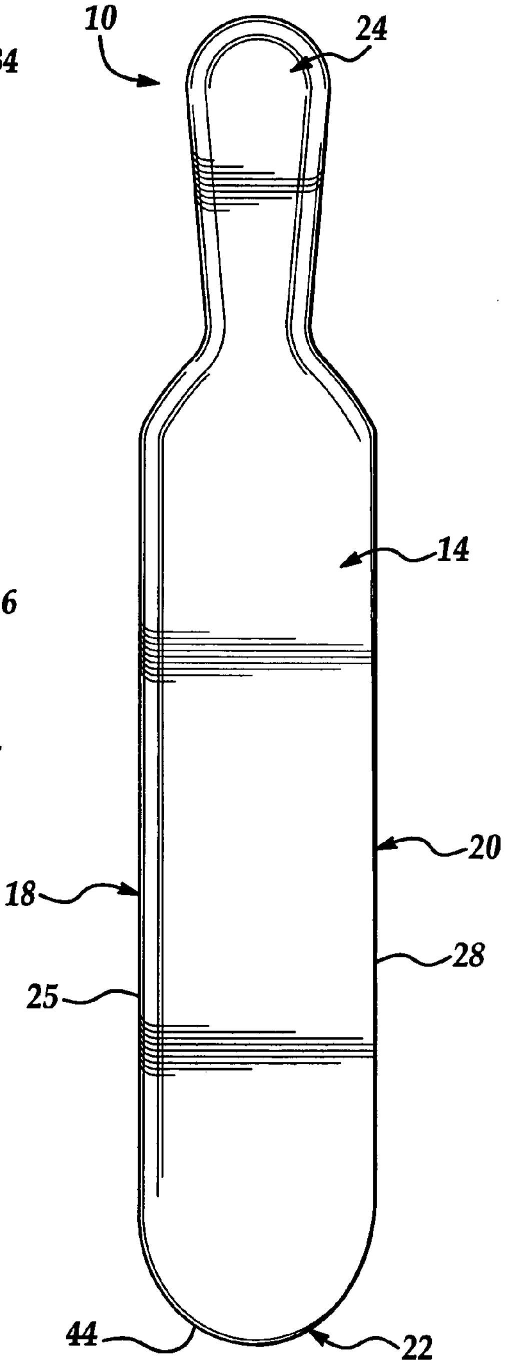
FIG. 7 is a bottom view of the pottery tool of FIG. 1.
Figure 8:
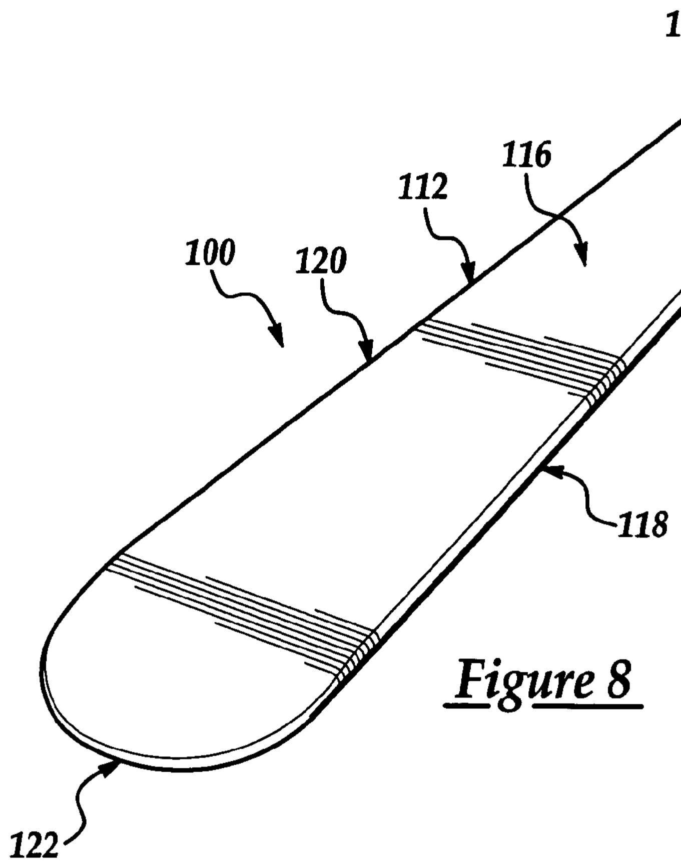
FIG. 8 is a perspective view of a second pottery tool embodying the invention.

As shown in FIGS. 4 and 7, the bottom side 14 is a smooth and generally flat or planar surface extending over substantially the entire bottom area of the elongate body 12. The bottom side 14 is generally parallel to the top side and generally perpendicular to the right side 18, the left side 20 and the ends 22 and 34.

Figure 2:
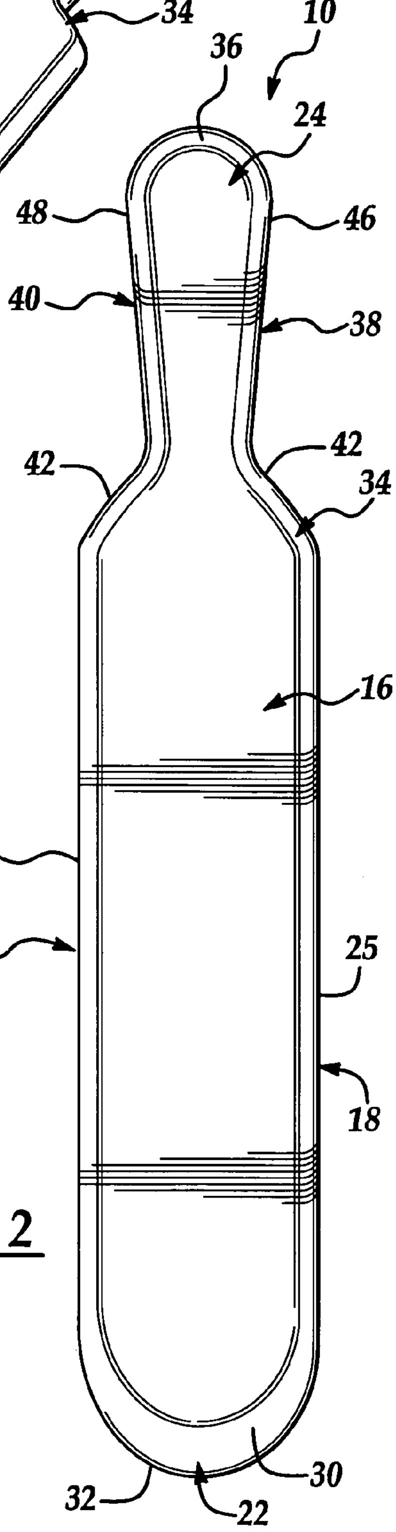
FIG. 2 is a top view of the pottery tool of FIG. 1.
Figure 3:
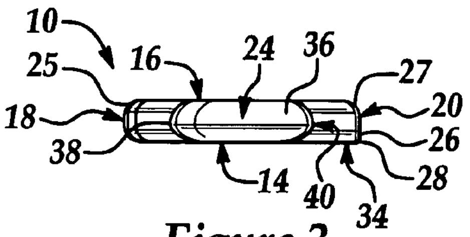
FIG. 3 is a right end view of the pottery tool of FIG. 1.

As shown in FIGS. 2 and 4, the top side 16 has a smooth and generally flat or planar surface that extends over a substantial portion of the elongate body 12 and is particularly useful for smoothing flat or slightly curved surfaces of a clay body by manually paddling, tapping, tamping or compressing the clay with the top surface 16. The top side 16 is generally parallel to the bottom side 14 and generally perpendicular to the right side 18, the left side 20 and the ends 22 and 34. The periphery of the top side 16 blends into the rounded edges 25, 27, and 36 of the right and left sides 18, 20 and the ends 22, 34. This rounded periphery is beneficial so that during the paddling process the clay body does not have creases or indents formed therein which a tool with sharp edges would produce.

Figure 5:
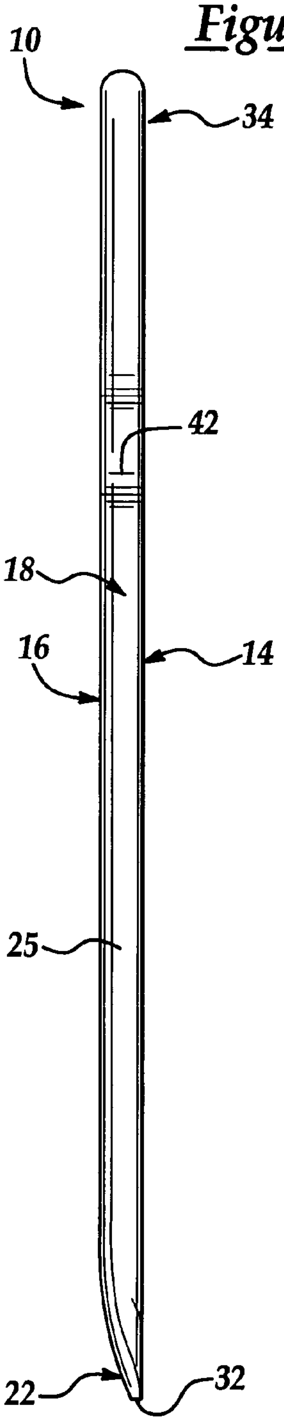
FIG. 5 is a right side view of the pottery tool of FIG. 1.

With reference now to FIG. 5, the right side 18 of the tool 10 has a generally semi-circular, rounded or bullnosed edge 25 that is particularly useful for compressing a body of clay by pressing the rounded edge 25 against a clay body laying on a flat surface such as a table top and dragging the tool 10 across the body with the edge 25 generally parallel to the table top. The compression process is often used for making a flat disc that will be used as a bottom of a cup or pitcher, for example. The rounded edge 25 extends along the length of the body 12 and in cross section is semi circular and blends into the bottom and top sides 14, 16. The rounded edge 25 also merges with the blunt surface 32 of the end 22 and extends along the shoulders 42 and along the handle 24. Preferably, the rounded edge 25 has a radius equal to one half the thickness of the body 12.

Figure 6:
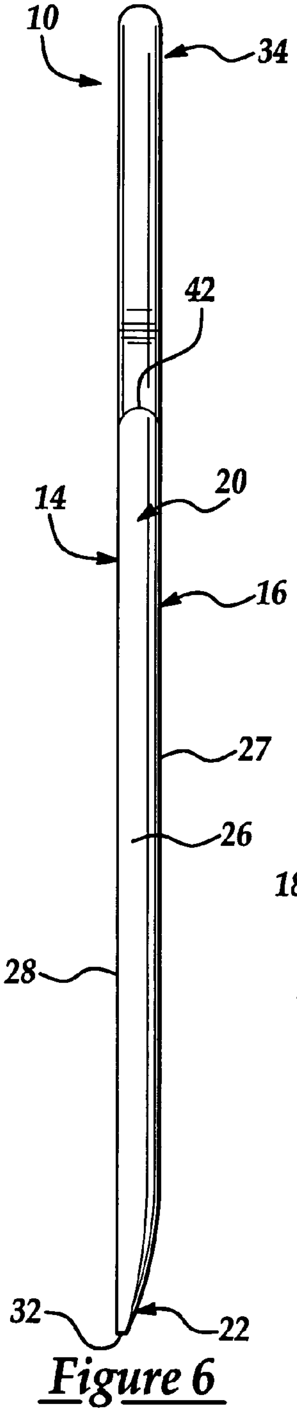
FIG. 6 is a left side view of the pottery tool of FIG. 1.

As shown in FIG. 6, the left side 20 of the tool 10 has a flat central surface 26 that is substantially perpendicular to the bottom and top sides 14, 16 and extends along the length of the body 12 and merges with the blunt surface 32 of the end 22 and the shoulder 42 of the end 34. The flat surface 26 forms the sharp edge 28 with the bottom side 14 preferably with a slight break or small radius. The sharp edge 28 is particularly suited for scraping surfaces of a clay body by dragging the sharp edge 28 against and across the body. The edge 27 is rounded with a radius either the same as or smaller than the radius of the rounded edge 25 of the right side 18 and blends into the flat surface 26 and the top side 16. Similar to the rounded edge 25 of the right side 18, the rounded edge 27 may be used for a compression process reducing the thickness and changing the shape of a portion of a clay body such as a rolled round rod of clay to a flat, ribbon or strip of clay.

With reference now to FIGS. 1-3 and 4-6, the blunt surface 32 of the end 22 has a semi-circular shape and is useful for tracing the ends of a flat layout of a pouring lip or spout on a flat clay body to be cut out and attached to a pottery article, such as a pitcher. Preferably the blunt surface 32 is perpendicular to the bottom 14 and forms a sharp edge therewith. The blunt surface 32 meets the tapered region 30 of the end 22 at an angle less than 90° or may otherwise blend with a small radius into the tapered region. Preferably, the semi circular surface 32 has a radius equal to one half the width of the adjacent portion of the body 12 into which it merges.

The tapered region 30 has a dome-like shape with a compound convex surface with a varying radius and is particularly useful for smoothing and shaping a clay body. This convex surface 30 blends into the top surface 16 and tapers with decreasing thickness of the body to the blunt surface 32. The steepness of the taper in the tapered region 34 affects the amount of curvature to be created on soft clay body. Typically, the taper or inclination of a line tangent to the mid-portion of the convex curvature is at an acute included angle relative to the bottom surface 14 in the range of about 10° to 50°. In use, the tool 10 is applied to the clay body so that the convex tapered region 34 is pressed against the clay body at an angle that will smoothly form the desired curvature or configuration on the body.

As shown in FIGS. 1 and 2, the handle 24 has a rounded end 36 which merges into right and left sides 38, 40 which are inclined inwardly and merge into shoulders 42 which extend outwardly to the sides of the body. In cross-section, the shoulders 42 and the sides 38, 40 and end 36 of the handle 24 have rounded edges 46 and 48 which respectively blend into the bottom and top faces 14, 16 of the body and preferably together form a semi-circle with a radius equal to one half the thickness of the body 12. The handle 24, as the name denotes, may be used for manually gripping and manipulating the tool 10 to use one of its various edges or surfaces in smoothening, shaping and/or scraping at least a portion of a soft clay body. Alternatively, the handle may be used as yet another shaping surface by manually grasping and holding the body 12 typically adjacent the shoulders 42 to manipulate the tool for forming and shaping a portion of the soft clay body.

The pottery tool 10 of the present invention may be used while forming a pottery article from softened clay by hand building or hand forming. To form a pitcher, for example, using the pottery tool 10, the user would first roll a ball of clay and flatten the clay by paddling the clay using the flat top side 16 to form a relatively flat disc, which will be the bottom of the pitcher. The flat disc may otherwise be formed by the compression method described above using one of the rounded edges 25 or 27. A second body of clay is then rolled into an elongate round rod (a so-called coil) and again is flattened to form an oblong, generally flat and rectangular sheet of softened clay. To form a sidewall the flat sheet is rolled into a round tube or hollow cylinder and its opposed abutting side edges are attached together.

The interior and exterior surfaces of the tubular wall formed from the flattened sheet and the bottom formed from the flat disc are then smoothed to remove unwanted lumps, for example, or shaped using the tool 10 by paddling the surfaces with the top side 16 of the tool 10. Specifically, the user grasps the tool 10 by the handle 26 and paddles the clay, softly to smoothen small lumps or harder to smoothen larger lumps, using the top side 16 of the tool 10. The tool 10 may also be used when attaching the lower end of the tubular sidewall to the bottom. To achieve more detailed surfaces and contours on the pitcher, the tapered region 30 of the tool 10 is preferably used as opposed to the flat surface of the top side 14. Such detailed surfaces may include smoothing the joint between the bottom and the interior surface of the sidewall of the pitcher. The tapered region 30 may also be used to expand portions of the wall by pressing the tapered region 30 against the interior surface of the wall and applying an outward directional pressure thereto. Likewise, portions of the wall of the pitcher can be contracted, or sunken in, by pressing the tapered region 30 against the exterior surface of the wall and applying an inward directional pressure thereto.

To form a handle portion of the pitcher, the user would then roll a preferably tapered round rod of clay using the rounded edges 25 and 27 or creased or scraped using the sharp edge 28 of the tool 10. If desired, the tapered rod could be flattened a bit into a ribbon using the top side 16 of the tool 10. The handle is applied to the exterior surface of the sidewall of the pitcher by scratching the points of attachment of both the handle and the wall, applying a clay slip thereto, and then pressing the attachment points of handle firmly to the wall. The handle can be made rather quickly using the tool 10 in comparison to the pulled handle method, where a piece of wet clay is held in a person's hand and pulled outwards therefrom. The pulled handle method, however, requires more skill and takes a considerably longer amount of time, as opposed to using the tool 10, to produce a desirably suitable handle.

To form a pouring lip, the user would use the blunt surface 36 of the end 22 and at least a portion of the right and left sides 18, 20 of the tool 10 to trace the shape of a layout of the spout on another flattened sheet of a body of softened clay using a knife edge. Typically, in a flat layout, the lip has opposed rounded ends with different radii interconnected by straight sides which taper between the ends. The rounded ends are laid out by tracing around some or all of the blunt end of the tool 10 and the tapered sides are traced along on a side edge 25 or 26 of the tool. The attachment point of the lip is the larger diameter rounded end. The flat layout is cut from the sheet of clay and then curved preferably to form a semi-circle cross section. The wider curved end of the lip is applied to the exterior surface of the wall of the cup by scratching the wall and the lip at the attachment points, applying a clay slip thereon and applying pressure thereto to press them together. Alternatively, a spout may be formed by flattening a rod of clay to about one-fourth or less of the thickness of the wall of the pitcher, rolling the flattened rod around a preferably tapered tool, such as a tube or a dowel and attaching together opposed side edges to form a hollow tubular spout. The spout is then attached to the pitcher using the same method as described for the lip. When the pitcher is finished, it may then be decorated or glazed and then fired in a kiln.

Second Embodiment

FIGS. 8-14 illustrate a second pottery tool 100 embodying the invention. The pottery tool 100 generally has an elongate body 112 with a bottom side 114, a top side 116, a right side 118, a left side 120, a first end 122 and a second end 124. The right and left sides 118, 120 are inclined or tapered toward each other and merge into the ends 122, 124 each of which preferably has a different configuration. The pottery tool 100 may otherwise have one, two, or more sides, wherein each side has a least one edge.

Generally, the bottom and top sides 114, 116 are planar, parallel and substantially the same as the bottom and top sides 14, 16 of the first embodiment. Other than being tapered rather than parallel, the right and left sides 118, 120 are substantially the same as the right and left sides 18, 20 of the first embodiment, where the right side 118 has a rounded edge 125 and the left side 120 has a flat surface 126, a rounded edge 127 and a sharp edge 128. The right and left sides 118, 120 of the second embodiment differ in that they are inclined or taper toward each other from a blunt surface 132 of the end 122 and merge with a blunt surface 134 formed at the end 124 of the tool 100.

Figure 9:
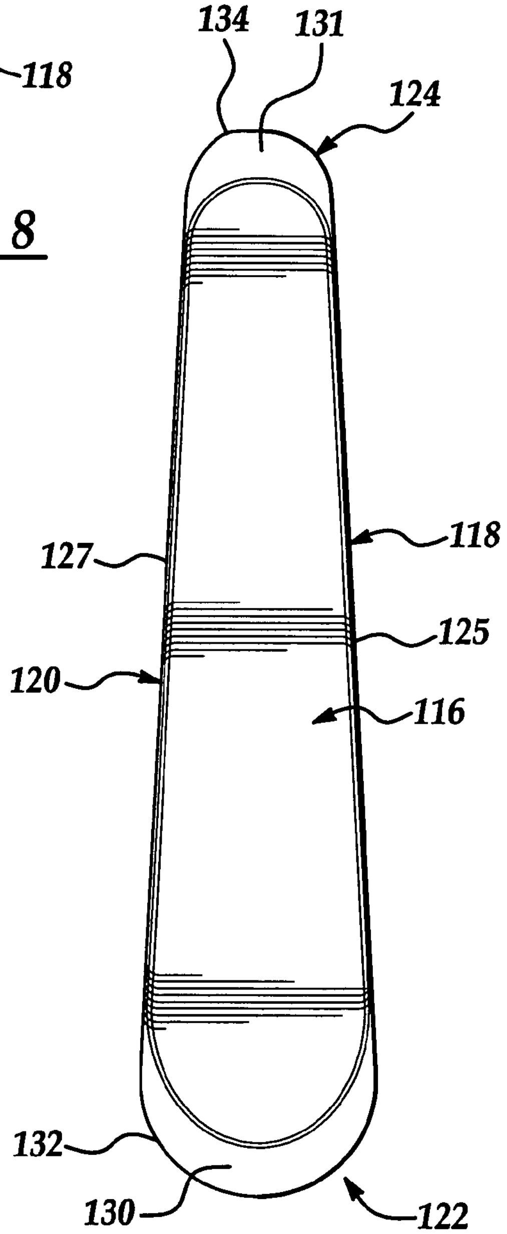
FIG. 9 is a top view of the pottery tool of FIG. 8.
Figure 10:
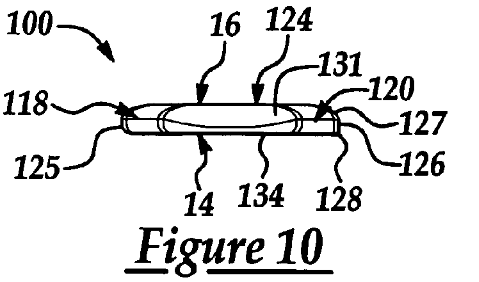
FIG. 10 is a right end view of the pottery tool of FIG. 8.
Figure 11:
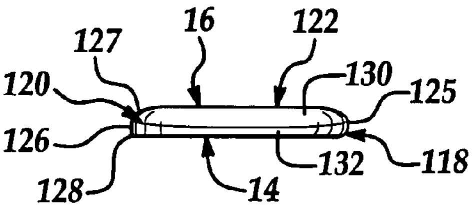
FIG. 11 is a left end view of the pottery tool of FIG. 8.
Figure 12:
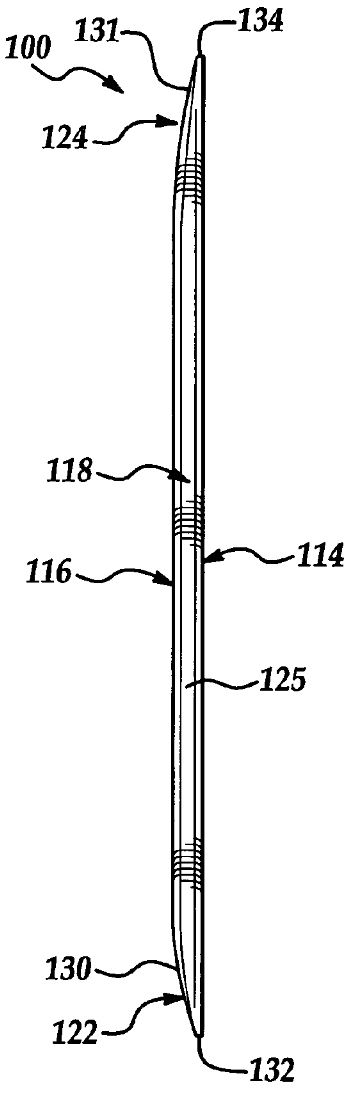
FIG. 12 is a right side view of the pottery tool of FIG. 8.
Figure 13:
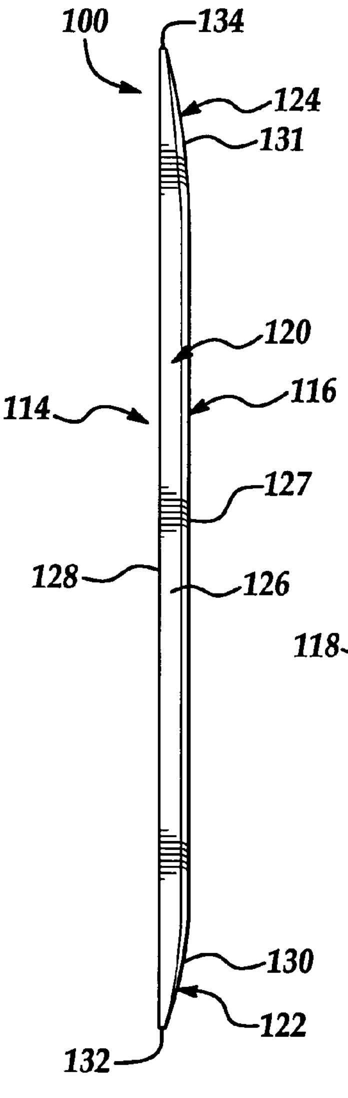
FIG. 13 is a left side view of the pottery tool of FIG. 8.
Figure 14:
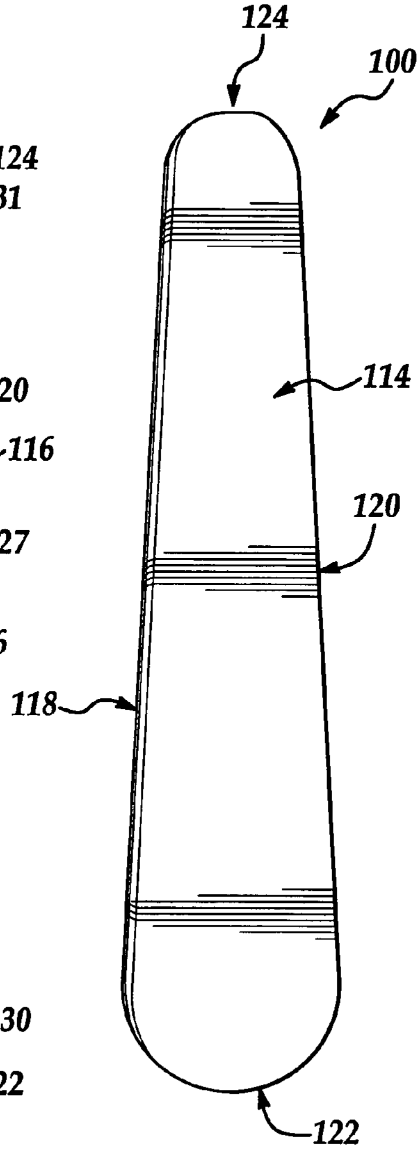
FIG. 14 is a bottom view of the pottery tool of FIG. 8.
Figure 15:
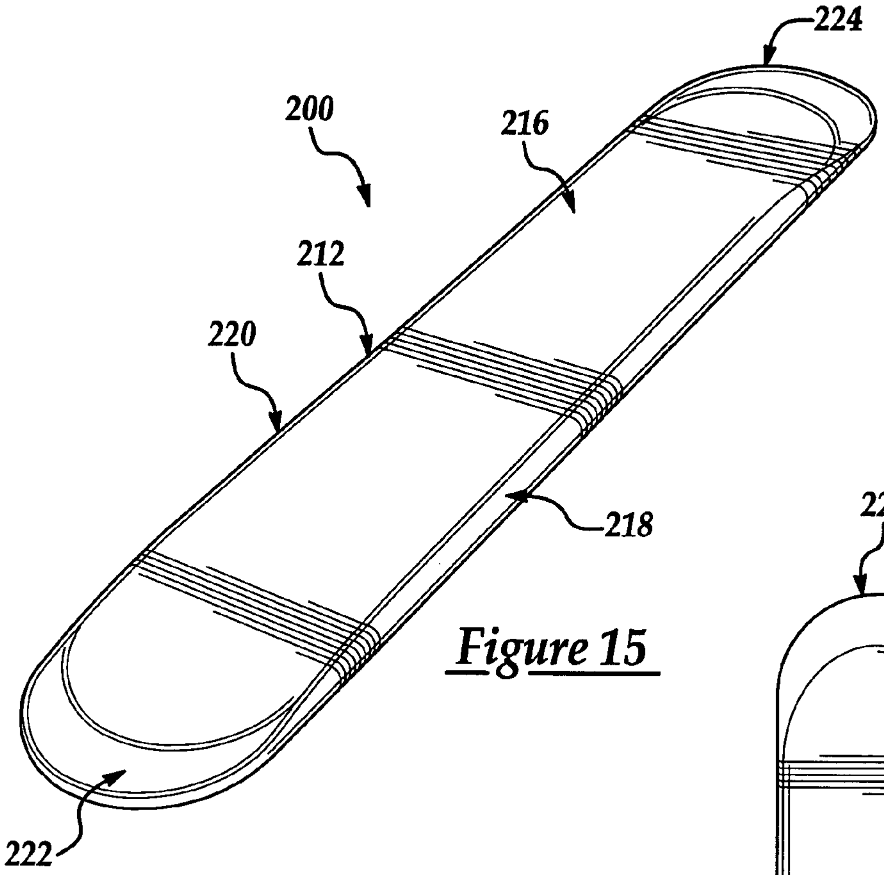
FIG. 15 is a perspective view of a third pottery tool embodying the invention.
Figure 16:
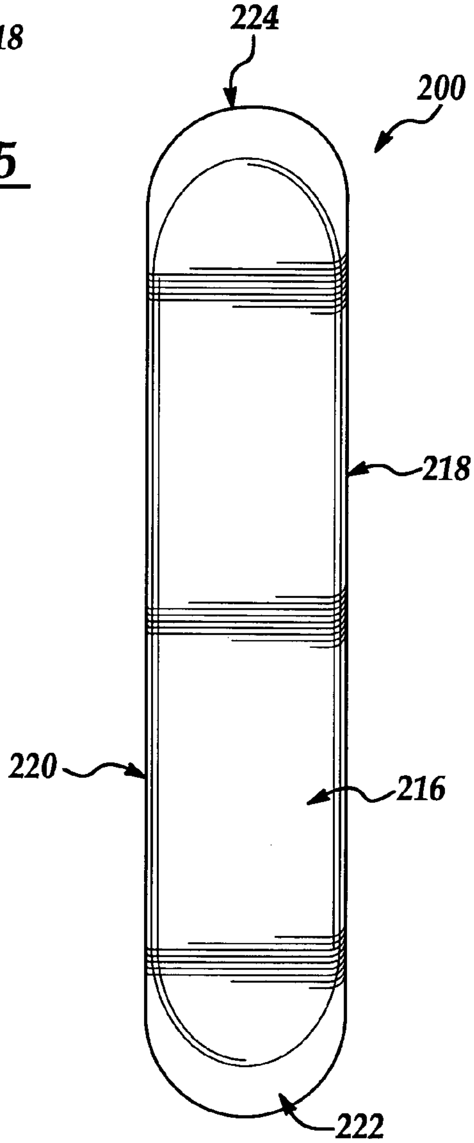
FIG. 16 is a top view of the pottery tool of FIG. 15.
Figure 17:
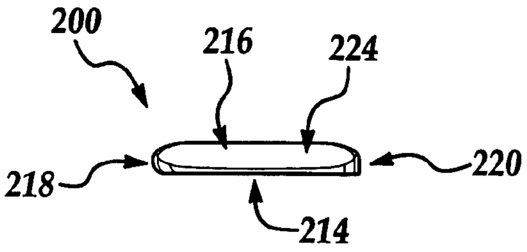
FIG. 17 is a right end view of the pottery tool of FIG. 15.
Figure 18:
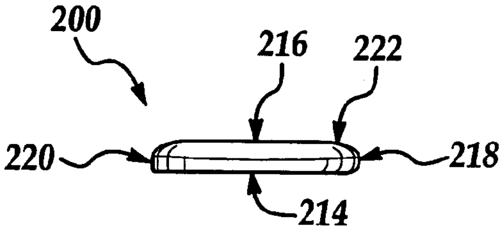
FIG. 18 is a left end view of in the pottery tool of FIG. 15.
Figure 19:
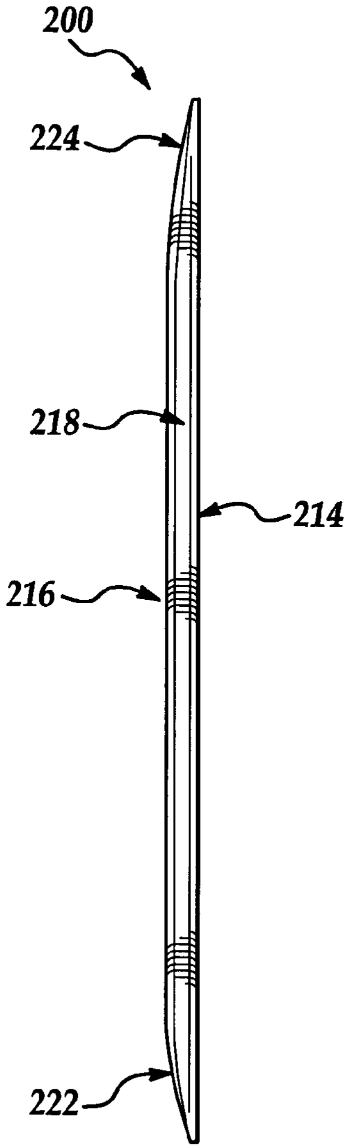
FIG. 19 is a right side view of the pottery tool of FIG. 15.
Figure 20:
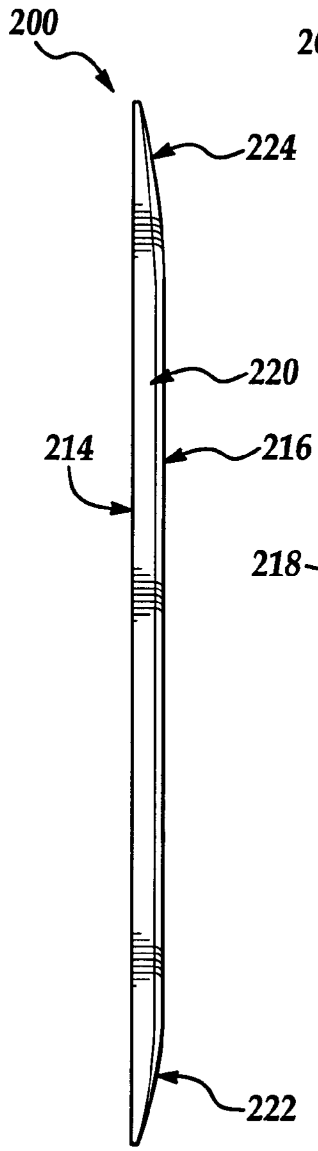
FIG. 20 is a left side view of the pottery tool of FIG. 15.
Figure 21:
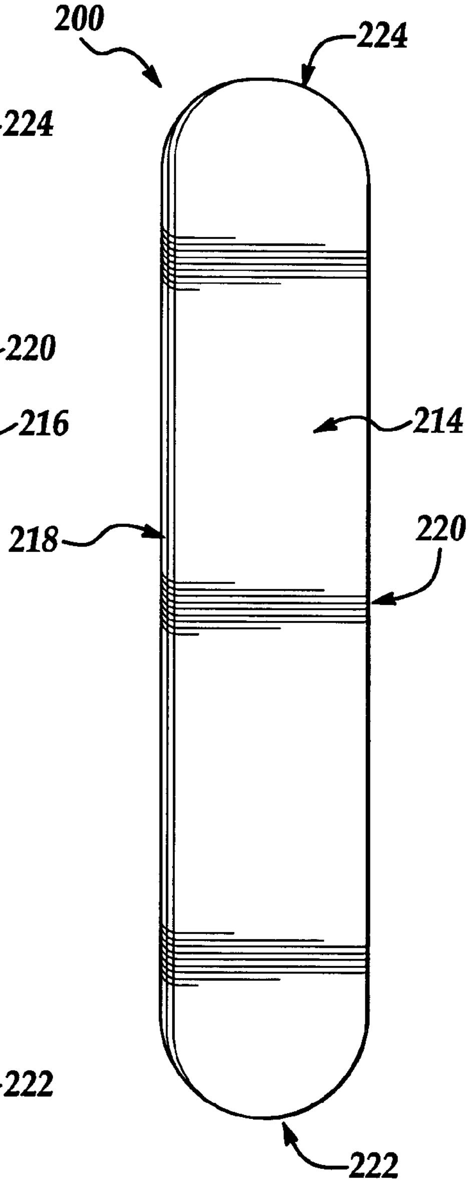
FIG. 21 is a bottom view of the pottery tool of FIG. 15.

The end 122 is substantially similar to the end 22 of the first embodiment and includes a tapered region 130 and the blunt surface 132. As shown in FIGS. 9-11, the end 124 is similarly constructed like the end 122 and includes a tapered region 131 and the blunt surface 134 that is substantially perpendicular to and forms a sharp edge 144 with the bottom side 114 and blends respectively into the generally round edge 125 of the right side 118 and the generally flat surface 126 of the left side 120. The tapered regions 130 and 131 each have a dome-like shape with a compound convex surface with a varying radius that blends into the top surface 116 and tapers with decreasing thickness of the body 112 to the respective blunt semi-circular surfaces 132 and 134. Similar to that as described for the first embodiment, the tapered regions 130 and 131 are used for paddling small areas on a pottery article and for forming somewhat detailed surfaces and contours thereon including expanding or contracting portions of the pottery article. The smaller tapered region 131 is more useful for smoothening surfaces requiring a smaller radial edge as opposed to the larger tapered region 130.

The pottery tool 100 is also useful for forming usually smaller pouring lips for a pottery article than the lips that may be formed by the pottery tool 10 of the first embodiment. A flat layout of the lip may be traced by a knife edge on a flattened sheet of clay using the blunt surface 134 of the smaller end 124 and at least a portion of the right and left sides 118 and 120 of the tool 100. The blunt surface 132 of the larger end 122 may be traced on the clay body opposite the lip formed by the blunt surface 134 to form the attachment point for attaching the lip to the pottery article. The tool 100 may also be used to form a layout of a lip wider than the tool but the tool must be shifted right and left to trace the sides of this wider lip and then the blunt surface 132 is used to trace the rounded ends of the wider layout.

Third Embodiment

FIGS. 15-21 illustrate a third pottery tool 200 embodying the invention. The pottery tool 200 is substantially the same of the pottery tool 100 of the second embodiment except that it has parallel right and left sides 218, 220. The pottery tool 200 generally has an elongate body 212 with a bottom side 214, a top side 216, a right side 218, a left side 220, a first end 222 and a second end 224. The right and left sides 218, 220 of the tool 200 are substantially parallel to each other and merge into the ends 222, 224. The pottery tool 200 may otherwise have one, two, or more sides, wherein each side has a least one edge. The pottery tool 200 is also multi-functional and may be used to smooth, shape and/or scrape a clay body to form a pottery article.

The pottery tools 10, 100 or 200 of the present invention may otherwise be used while forming a pottery article from softened clay during a pottery throwing process, i.e., when the clay is being rotated on a potter's wheel. The user would simply hold a surface or edge of the pottery tool 10, 100 or 200 at a desired angle or position and apply a desired amount of pressure thereto. As the clay body rotates on the potter's wheel, frictional contact between the pottery tool and the clay body displaces a portion of the mass of the body in a generally opposite direction, thereby shaping the clay body as it rotates. When finished, the clay body is removed from the potter's wheel, may be decorated or glazed, and fired in a kiln to thereby form the pottery article.

While the forms of the invention herein disclosed constitute presently preferred embodiments, many others are possible. It is not intended herein to mention all the possible equivalent forms or ramifications of the invention. It is understood that terms used herein are merely descriptive, rather than limiting, and that various changes may be made without departing from the spirit and scope of the invention as defined by the following claims.

The invention claimed is:

1. A tool for forming a body of soft clay for making a pottery article comprising:

an elongate body having an elongate exterior bottom, an elongate exterior top, at least two sides each having an exterior surface, a first end and a second end;

said bottom having a surface which is substantially planar substantially throughout the elongate longitudinal length and transverse width of said body;

one of said sides having a flat exterior surface extending generally longitudinally along and substantially perpendicular to said bottom and forming a sharp edge with said bottom, another of said sides having an exterior surface with a generally rounded cross-section blending into the bottom and differing from a cross-section of the exterior surface of said one side;

a tapered region adjacent said first end with a generally convex surface which blends into the top and tapers toward said one end and the bottom with a decreasing thickness of the body and said generally convex surface extends across said top;

one of said ends having a generally semi-circular shape with an exterior surface substantially perpendicular to said bottom and forming a sharp edge with said bottom; and each of said top, bottom, side, sharp edge and convex surface has a configuration constructed for forming at least a portion of a body of soft clay.

2. The tool of claim 1 wherein said elongate top is substantially planar and substantially parallel to said bottom.

3. The tool of claim 1 wherein said top is generally flat and the periphery of said flat top blends with adjacent sides of said elongate body.

4. The tool of claim 3 wherein the other of said sides in cross-section has a generally rounded exterior surface which blends into said top and bottom.

5. The tool of claim 1 wherein said one side has a rounded edge which blends into said top and said flat exterior surface of said one side.

6. The tool of claim 1 wherein at least one of said sides has a rounded edge.

7. The tool of claim 1 wherein each of said first and second ends comprises a blunt surface.

8. The tool of claim 7 wherein said flat exterior surface of said one side merges with said blunt surface of at least one of said ends.

9. The tool of claim 7 wherein said blunt surface has a semi-circular shape.

10. The tool of claim 1 which comprises a tapered region adjacent said second end which blends into the top and tapers toward said second end and bottom with decreasing thickness of the body.

11. The tool of claim 10 wherein said tapered region adjacent said second end has a compound convex surface.

12. The tool of claim 7 wherein said first and second ends each comprise a tapered region blending into said top and each said tapered region has a compound convex surface.

13. The tool of claim 1 further comprising a handle remote from said first end.

14. The tool of claim 1 wherein said two sides of said elongate body are inclined toward each other.

15. A tool for forming a body of soft clay for making a pottery article comprising:

an elongate body having an elongate exterior bottom, an elongate exterior top, at least two elongate sides, and first and second ends;

said bottom having a surface which is substantially planar substantially throughout the elongate longitudinal length and transverse width of said body;

one of said sides having a flat exterior surface extending generally longitudinally along and substantially perpendicular to said bottom and forming a sharp edge with said bottom;

a tapered region formed on said elongate body at least adjacent said first end which blends into the top and tapers toward said first end and the bottom with a decreasing thickness of the body and the tapered region extends across said top;

one of said ends having a generally semi-circular shape with an exterior surface substantially perpendicular to said bottom and forming a sharp edge with said bottom; and each of said top, bottom, sides and tapered region being constructed for shaping at least a portion of a body of soft clay.

16. The tool of claim 15 wherein said elongate body further comprises a generally flat top exterior surface.

17. The tool of claim 16 wherein said generally flat top exterior surface blends with each of said two elongate sides of said body.

18. The tool of claim 15 wherein said surface of said at least one side has a rounded edge which blends into said top and said flat exterior surface of said one side.

19. The tool of claim 15 wherein said surface of said other side has a generally rounded exterior surface which blends with said top and said bottom exterior surface.

20. The tool of claim 15 wherein said first end has a blunt surface having a generally semi-circular shape and wherein said blunt surface is generally perpendicular to the bottom, forms a sharp edge with the bottom and merges with at least said flat exterior surface of said one side.

21. The tool of claim 15 which comprises a tapered region having a compound convex surface adjacent one of said ends which blends into the top and tapers toward said one end and the bottom with decreasing thickness of the body.

22. The tool of claim 15 further comprising a handle distal from said first end of said elongate body.

23. The tool of claim 15 wherein said two sides of said elongate body are tapered toward each other and one of the ends of the body.

24. A tool for forming a body of soft clay for making a pottery article comprising:

an elongate body including:

a generally flat bottom surface extending substantially throughout the longitudinal length and transverse width of the body;

a generally flat top surface substantially parallel to said bottom surface;

a right side and left side, one of said sides having a flat surface generally perpendicular to one of said top or bottom surfaces and forming a sharp edge therewith;

at least one end;

at least one tapered region having a compound convex surface adjacent said one end, blending into the other of said top and bottom surfaces and with a decreasing thickness of said body toward said one end and said one of said top and, bottom surfaces and said tapered region extending across the other of said top and bottom surfaces;

said one end also having a generally semi-circular exterior surface substantially perpendicular to said bottom and forming a sharp edge with said bottom;

at least two of said sides each having an exterior surface which in cross-section has a different configuration; and each of said top surface, bottom surface, tapered region and sides being constructed for shaping at least a portion of a body of soft clay.

* * * * *